(12) United States Patent
Masuda

(10) Patent No.: US 10,852,223 B2
(45) Date of Patent: Dec. 1, 2020

(54) FLOW CELL AND MEASURING DEVICE

(71) Applicant: ARKRAY, Inc., Kyoto (JP)

(72) Inventor: Shigeki Masuda, Kyoto (JP)

(73) Assignee: ARKRAY, Inc., Kyoto (JP)

( * ) Notice: Subject to any disclaimer, the term of this patent is extended or adjusted under 35 U.S.C. 154(b) by 0 days.

(21) Appl. No.: 15/856,842

(22) Filed: Dec. 28, 2017

(65) Prior Publication Data

US 2018/0202915 A1    Jul. 19, 2018

(30) Foreign Application Priority Data

Jan. 13, 2017  (JP) ................................ 2017-004318

(51) Int. Cl.
*G01N 15/14* (2006.01)
*B01L 3/00* (2006.01)
*G01N 15/10* (2006.01)

(52) U.S. Cl.
CPC .... *G01N 15/1404* (2013.01); *B01L 3/502776* (2013.01); *G01N 15/147* (2013.01); *G01N 15/1484* (2013.01); *B01L 2200/0636* (2013.01); *B01L 2300/0816* (2013.01); *B01L 2300/0874* (2013.01); *G01N 2015/1006* (2013.01); *G01N 2015/1409* (2013.01); *G01N 2015/1413* (2013.01)

(58) Field of Classification Search
CPC ....... G01N 15/1404; G01N 2015/1413; G01N 2015/1411; G01N 2015/1409
See application file for complete search history.

(56) References Cited

U.S. PATENT DOCUMENTS

2004/0266022 A1 * 12/2004 Sundararajan ...... B01F 13/0062
436/180
2005/0123450 A1 * 6/2005 Gilbert ............... G01N 15/1484
422/81
2011/0284378 A1    11/2011 Shinoda
(Continued)

FOREIGN PATENT DOCUMENTS

JP         2006-506648 A    2/2006
JP           5897681 B2    3/2016
(Continued)

OTHER PUBLICATIONS

Extended European Search Report issued by the European Patent Office dated May 11, 2018, which corresponds to EP18151094.2-1001 and is related to U.S. Appl. No. 15/856,842.
(Continued)

*Primary Examiner* — Rebecca C Bryant
(74) *Attorney, Agent, or Firm* — Studebaker & Brackett PC

(57) ABSTRACT

A flow cell has: a flow path in which a specimen fluid and a sheath fluid flow; a specimen flow path that introduces the specimen fluid into the flow path; a first sheath flow path and a second sheath flow path that introduce the sheath fluid into the flow path; and a merging portion at which the specimen flow path, the first sheath flow path and the second sheath flow path merge together. The specimen flow path is provided on a central flow line of the flow path. At the merging portion, the first sheath flow path and the second sheath flow path face directions intersecting the central flow line of the flow path, and are disposed at positions that are offset in a depth direction of the flow path.

7 Claims, 12 Drawing Sheets

(56) References Cited

U.S. PATENT DOCUMENTS

2017/0299492 A1* 10/2017 Rindorf ............ B01L 3/502746
2017/0304827 A1* 10/2017 Yuan ................. G01N 15/1404
2018/0038783 A1*  2/2018 Yamamoto ........ B01L 3/502776
2018/0313740 A1* 11/2018 Otsuka .................. G01N 15/14
2018/0372612 A1* 12/2018 Masuda ............... G01N 15/147

FOREIGN PATENT DOCUMENTS

WO      2008/125081 A1    10/2008
WO      2016-050837 A1     4/2016

OTHER PUBLICATIONS

Communication pursuant to Article 94(3) EPC issued by the European Patent Office dated Mar. 13, 2020, which corresponds to European Patent Application No. 18 151 094.2-1001 and is related to U.S. Appl. No. 15/856,842.
Marcin Frankowski et al., "Microflow Cytometers with Integrated Hydrodynamic Focusing", Sensors, Apr. 9, 2013, pp. 4674-4693, vol. 13, doi:10.3390/s130404674, ISSN 1424-8220.
An Office Action; "Notice of Reasons for Refusal," mailed by the Japanese Patent Office on Jul. 14, 2020, which corresponds to Japanese Patent Application No. 2017-004318 and is related to U.S. Appl. No. 15/856,842; with English language translation.

* cited by examiner

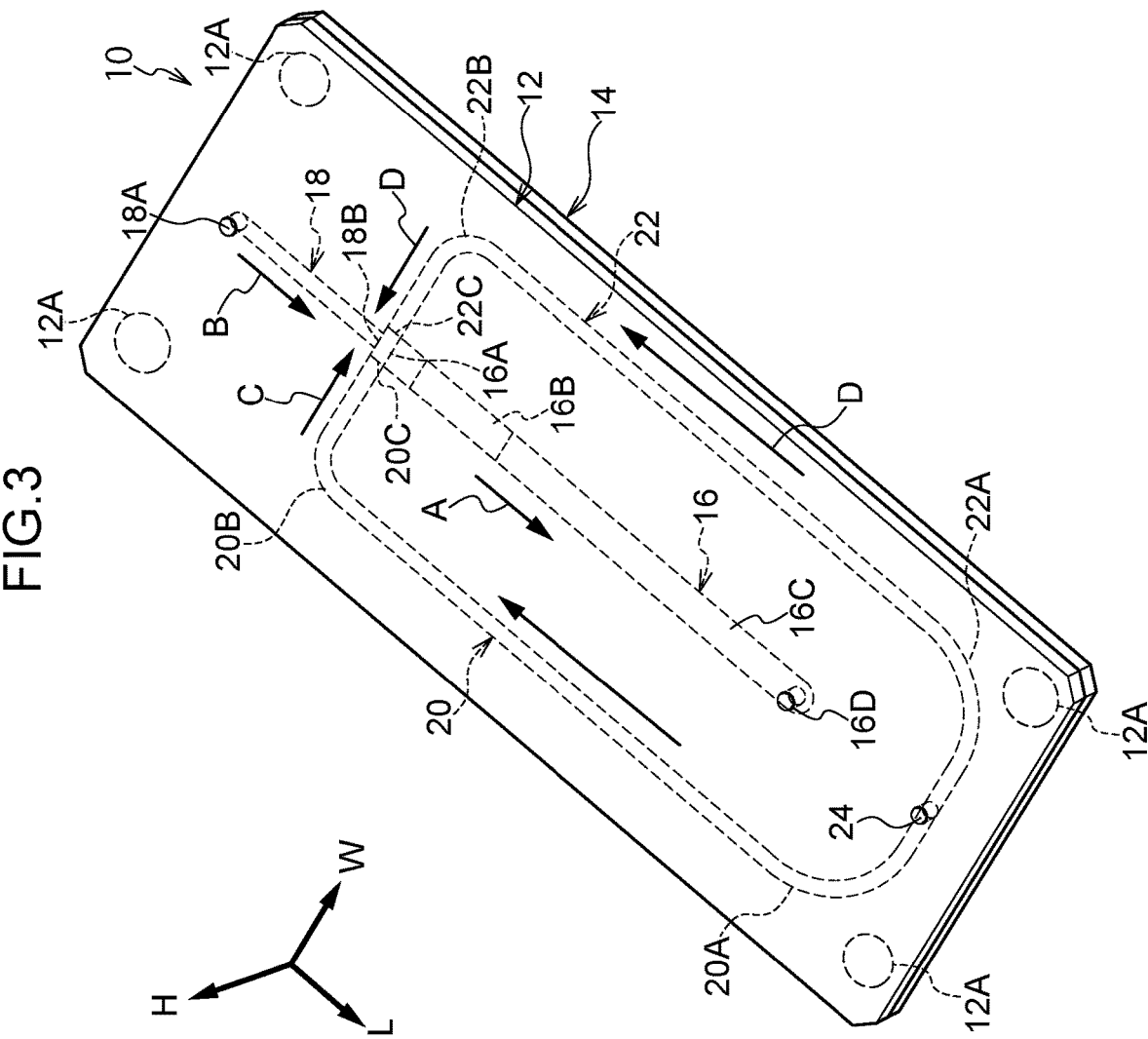

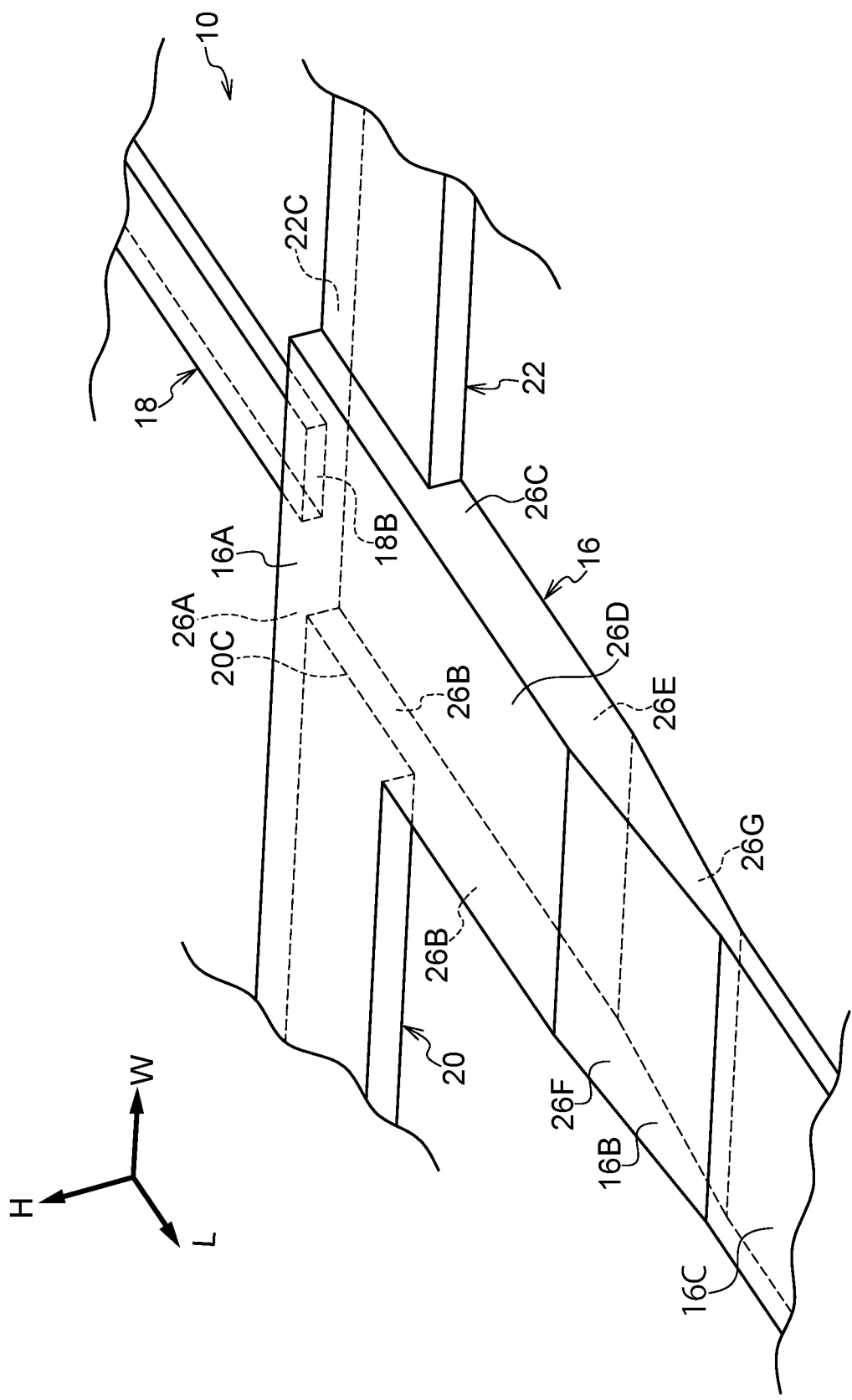

FLOW CELL AND MEASURING DEVICE

CROSS-REFERENCE TO RELATED APPLICATION

This application is based upon and claims the benefit of priority of the prior Japanese Patent Application No. 2017-004318, filed on Jan. 13, 2017, the entire contents of which are incorporated herein by reference.

FIELD

The embodiments discussed herein are related to a flow cell and a measuring device.

BACKGROUND

Patent Document 1 (Japanese Patent Application National Publication (JP-A) No. 2006-506648) discloses a flow cell in which a specimen is made to flow into the center of a sheath fluid by a cannula. In this flow cell, the sheath fluid and the specimen fluid are fed together, and by making the flow path downstream of the flow cell be narrow, the entire fluid is squeezed, and the specimen fluid is imaged by a camera.

Further, Patent Document 2 (Japanese Patent No. 5897281) discloses a microchip in which a sheath fluid is made to flow-in from left and right introducing flow paths that are disposed at obtuse angles with respect to the downstream side in the flowing direction of the fluid, and a specimen fluid is introduced into the central portion of the sheath fluid. In this microchip, a flow contracting portion whose flow path width and flow path depth are small is provided at the downstream side of a flow path. The specimen fluid is collected at the center of the sheath fluid by the flow contracting portion, and laser light is irradiated thereon, and the light generated from the particles is detected.

In the structure disclosed in Patent Document 1 (JP-A No. 2006-506648), the specimen fluid and the sheath fluid mix together at a merging point, and, thereafter, even though the fluids are converged, there is the possibility that some of the specimen fluid will fall outside of the so-called depth of field (also called subject depth of field) which is the range of focus of the optical system. Further, because the volume of the flow cell is large, the amount of the sheath fluid that is consumed is large, and further, the structure of the flow cell is complex, and the manufacturing cost rises.

The structure disclosed in Patent Document 2 (Japanese Patent No. 5897281) is a microchip, and the amount of sheath fluid that is consumed is small. However, in order to achieve the object of detecting light from the particles by laser light, the specimen fluid is collected at the center (the central portion) of the sheath fluid by the flow contracting portion at which the dimensional difference between the flow path width and the flow path depth is small. Therefore, this is a structure that is unsuitable for imaging a specimen fluid by a camera.

SUMMARY

In view of the above-described circumstances, an object of the present disclosure is to provide a flow cell and a measuring device that, while suppressing the mixing of a specimen fluid with a sheath fluid, causes the specimen fluid to flow in a laminar flow state at the central portion in the depth direction of the sheath fluid.

A flow cell of the present disclosure has: a flow path in which a specimen fluid and a sheath fluid flow; a specimen flow path that introduces the specimen fluid into the flow path; a first sheath flow path and a second sheath flow path that introduce the sheath fluid into the flow path; and a merging portion at which the specimen flow path, the first sheath flow path and the second sheath flow path merge together, wherein the specimen flow path is provided on a central flow line of the flow path, and wherein, at the merging portion, the first sheath flow path and the second sheath flow path face directions intersecting the central flow line of the flow path and are disposed at positions that are offset in a depth direction of the flow path.

In the flow cell of the present disclosure, the specimen flow path may be disposed between the first sheath flow path and the second sheath flow path in the depth direction of the flow path.

The flow cell of the present disclosure may further have: a planar portion that is formed at a downstream side of the flow path, and whose depth is more shallow than a depth of the merging portion; and a tapered portion that connects the merging portion and the planar portion, and whose depth gradually becomes more shallow toward a downstream side.

In the flow cell of the present disclosure, the central flow line of the flow path and a central flow line of the first sheath flow path may be orthogonal, and the central flow line of the flow path and a central flow line of the second sheath flow path may be orthogonal.

In the flow cell of the present disclosure, a sheath intake opening may be used in common for the first sheath flow path and the second sheath flow path, and bent portions may be formed along the first sheath flow path and the second sheath flow path.

A measuring device of the present disclosure has: the flow cell of the present disclosure; an imaging mechanism, which is provided at a position facing the flow cell, for imaging the specimen fluid that flows at a downstream side of the flow path; a specimen supplying mechanism, which is connected to the specimen flow path, for supplying the specimen fluid to the specimen flow path; and a sheath supplying mechanism, which is connected to the first sheath flow path and the second sheath flow path, for supplying the sheath fluid to the first sheath flow path and the second sheath flow path.

In the measuring device of the present disclosure, the imaging mechanism may be disposed at a position facing a planar portion whose depth is more shallow than a depth of the merging portion at the flow cell.

In accordance with the flow cell and the measuring device of the present disclosure, a specimen fluid can be made to flow in a laminar flow state at the central portion in the depth direction of a sheath fluid, while mixing of the specimen fluid with the sheath fluid is suppressed.

BRIEF DESCRIPTION OF DRAWINGS

FIG. 3 is a perspective view showing the flowing directions of a specimen fluid and a sheath fluid of the flow cell that is shown in FIG. 1.

FIG. 5 is a schematic perspective view showing an introducing opening for the specimen fluid, a first introducing opening for the sheath fluid, and a second introducing opening for the sheath fluid, into the merging portion of the flow path of the flow cell shown in FIG. 1.

DESCRIPTION OF EMBODIMENTS

Figure 1:
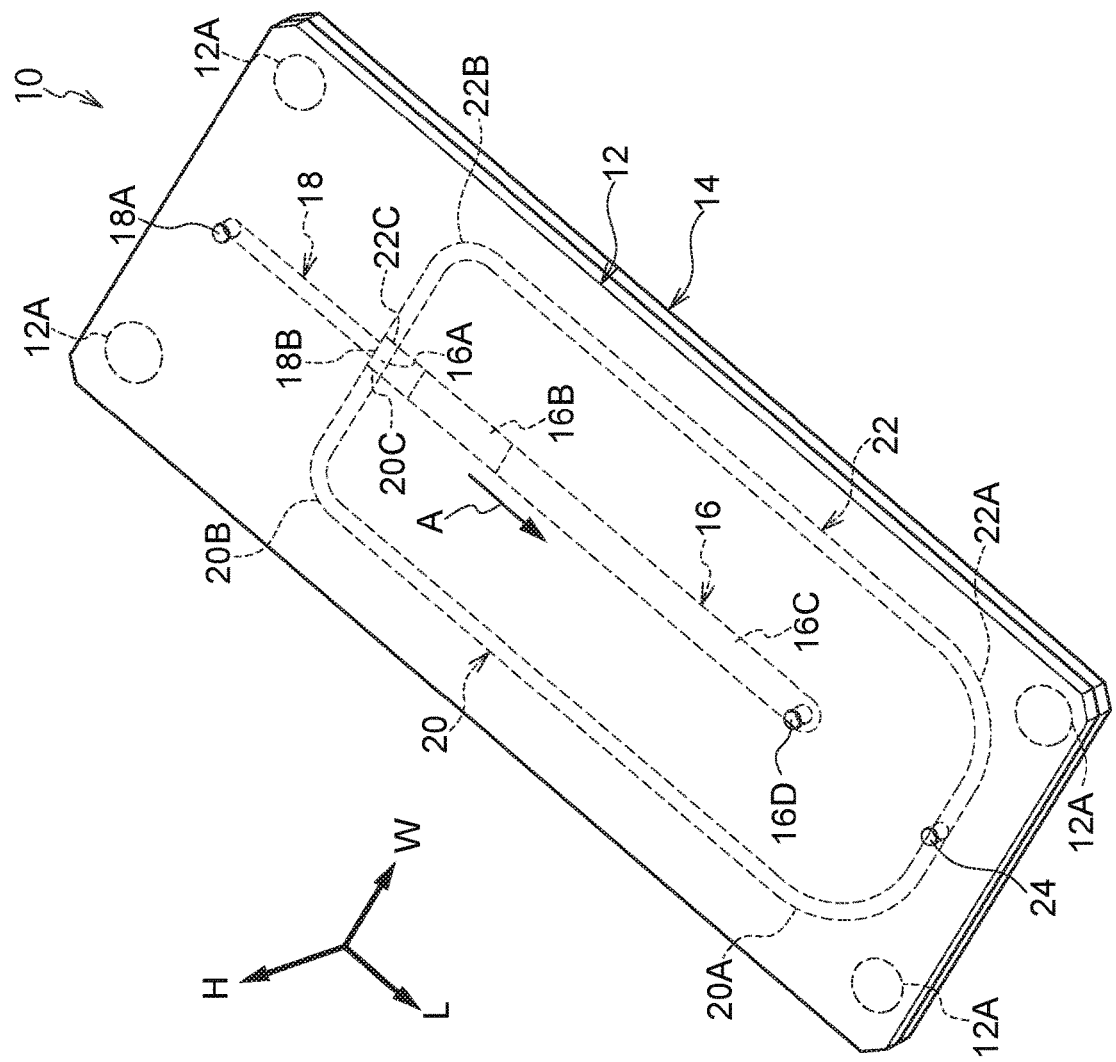
FIG. 1 is a perspective view showing a flow cell relating to a first embodiment.

An embodiment of the present disclosure is described on the basis of the drawings. Note that arrow H that is shown appropriately in the drawings indicates the height direction of a flow cell, and arrow W indicates the width direction of the flow cell. Further, in the drawings, arrow L indicates the length direction of the flow cell that is orthogonal to the height direction and the width direction respectively (i.e., arrow L indicates the downstream side in the flowing direction of a flow path after a sheath fluid and a specimen fluid have merged). Further, in the present specification, when there are numerical ranges expressed by using "~", the numerical range means a range that includes, as the lower limit value and the upper limit value thereof, the numerical values that are given before and after the "~".

First Embodiment

A flow cell of a first embodiment of the present disclosure, and a measuring device for imaging a specimen fluid of the flow cell, are described hereinafter by using FIG. 1 through FIG. 11.

(Structure of Flow Cell)

Figure 2:
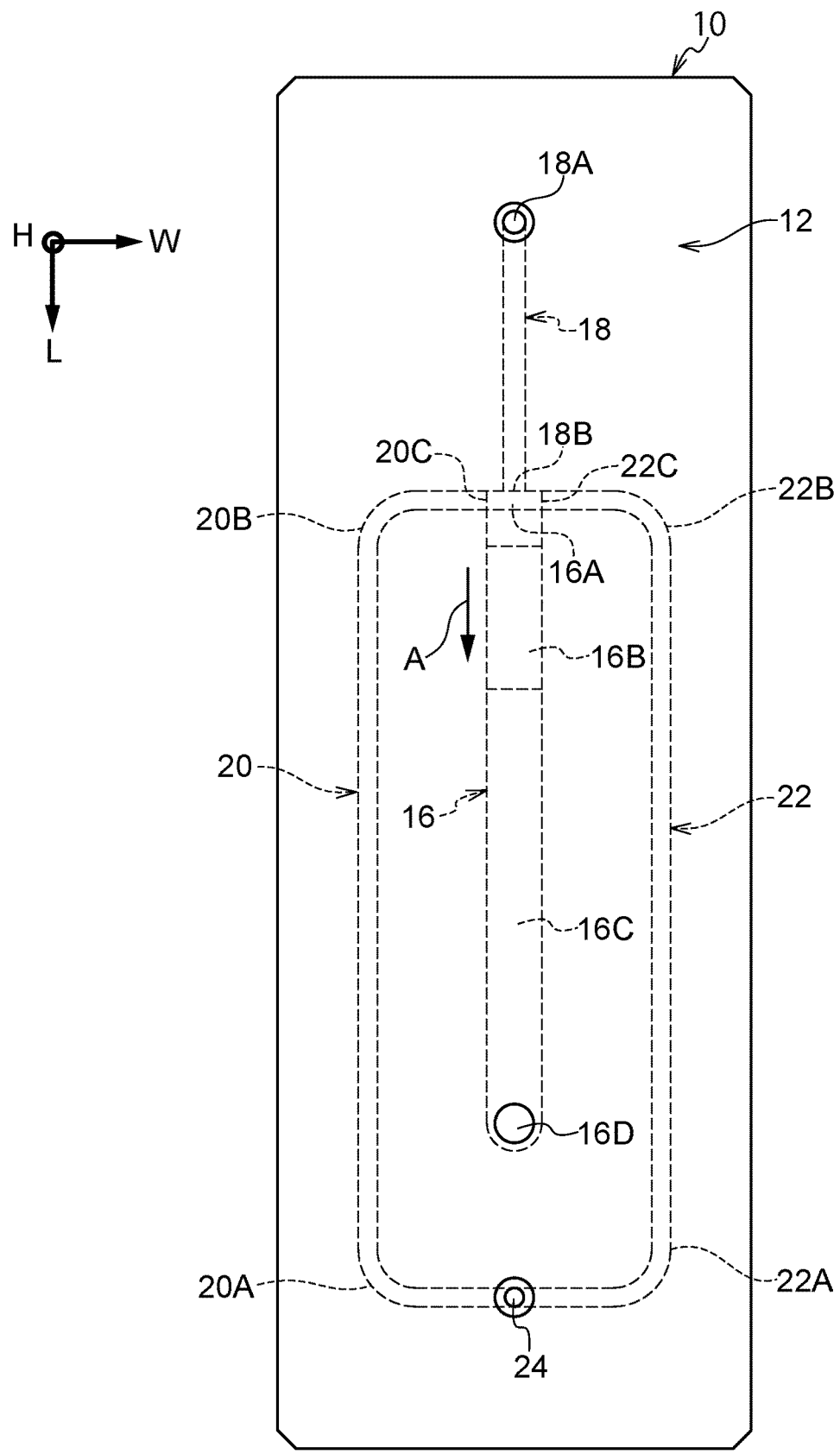
FIG. 2 is a plan view showing the flow cell that is shown in FIG. 1.

A flow cell 10 of a first embodiment is shown in FIG. 1 in a perspective view, and the flow cell 10 is shown in FIG. 2 in a plan view. Further, the flowing directions of a specimen fluid and a sheath fluid at the flow cell 10 are shown in FIG. 3 in a perspective view. The flow cell 10 of the first embodiment is used in, for example, a urine sediment test that, by introducing a urine specimen which is an example of a specimen fluid, together with a sheath fluid, captures images of formed elements of the urine specimen by an imaging mechanism of a measuring device, and carries out analysis from the shapes and the like of the formed elements in the captured images. In the first embodiment, a urine specimen is used as the example of the specimen fluid, and a urine sediment test is carried out, but the flow cell 10 can also be used for other specimens and applications.

As shown in FIG. 1 through FIG. 3, the flow cell 10 is a plate-shaped member that is substantially rectangular. In the first embodiment, the flow cell 10 is a structure in which a first plate-shaped body 12 and a second plate-shaped body 14 are affixed together in a planarly-contacting state. The flow cell 10 has (see FIG. 3) a flow path 16, in which a specimen fluid 2 and a sheath fluid 4 (see FIG. 6A) flow, and a specimen flow path 18 that is provided at the upstream side (the side opposite direction L) in the flowing direction, which is shown by arrow A, of the flow path 16 on a central flow line L1 (see FIG. 4A and FIG. 4B) of the flow path, and in which the specimen fluid flows. Here, the central flow line means an imaginary line that connects the centers of the flow path in which the fluids flow (in the case of this example, the flow path 16 in which the specimen fluid 2 flows). Further, the flow cell 10 has a first sheath flow path 20 that is disposed so as to intersect the central flow line L1 (see FIG. 4A and FIG. 4B) of the flow path 16 at the upstream side in the flowing direction of the flow path 16, and in which the sheath fluid flows. Moreover, the flow cell 10 has a second sheath flow path 22 that intersects the central flow line L1 (see FIG. 4A and FIG. 4B) of the flow path 16 at the upstream side in the flowing direction of the flow path 16, and is disposed at the side opposite the first sheath flow path 20, and in which the sheath fluid flows.

The specimen flow path 18 is disposed in a substantially rectilinear form along the length direction of the flow cell 10, and is structured such that the specimen fluid 2 (see FIG. 6A) flows therein in the arrow B direction in FIG. 3. An intake opening 18A into which the specimen fluid 2 is supplied is formed at the upstream side end portion in the flowing direction (i.e., the arrow B direction) of the specimen flow path 18. A supply tube (not illustrated) that supplies the specimen fluid 2 (see FIG. 6A) is connected to the intake opening 18A of the specimen flow path 18. At the specimen flow path 18, the specimen fluid 2 that is supplied from the intake opening 18A flows toward the flow path 16.

The first sheath flow path 20 is formed in a substantial U-shape that is disposed so as to be laterally long along the length direction of the flow cell 10 as seen in plan view. The open side of the substantial U-shape faces the width direction (i.e., direction W) of the flow cell 10. The first sheath flow path 20 is disposed at one side in the height direction (direction H) of the flow cell 10. In the first embodiment, the first sheath flow path 20 is formed at the first plate-shaped body 12 side.

The first sheath flow path 20 is structured such that the sheath fluid 4 (see FIG. 6A) flows therein in the arrow C direction in FIG. 3. A sheath intake opening 24 into which the sheath fluid 4 is supplied is formed at the upstream side end portion in the flowing direction of the first sheath flow path 20 (i.e., the arrow C direction). In other words, at the first sheath flow path 20, the sheath fluid 4 that is supplied from the sheath intake opening 24 flows in a direction toward the upstream side of the flow path 16. Two bent portions 20A, 20B are formed at the first sheath flow path 20 along the way of the flowing direction. The bent portions 20A, 20B of the first sheath flow path 20 are respectively bent in substantially orthogonal directions, and are formed such that the corner portions of the bent portions are curved in rounded shapes.

The second sheath flow path 22 is formed in a substantial U-shape that is disposed so as to be laterally long along the length direction of the flow cell 10 as seen in plan view. The open side of the substantial U-shape faces the width direction (i.e., direction W) of the flow cell 10 and the open side of the substantial U-shape of the first sheath flow path 20. The second sheath flow path 22 is disposed at the other side in the height direction (i.e., direction H) of the flow cell 10, i.e., is disposed at a different side in the height direction than the first sheath flow path 20. In the first embodiment, the second sheath flow path 22 is formed at the second plate-shaped body 14 side. The second sheath flow path 22 and the first sheath flow path 20 are formed symmetrically in the width direction as seen in a plan view of the flow cell 10, but the positions, in the height direction of the flow cell 10, of the second sheath flow path 22 and the first sheath flow path 20 are different.

The second sheath flow path 22 is structured such that the sheath fluid 4 (see FIG. 6A) flows therein in the arrow D direction in FIG. 3. The sheath intake opening 24 is connected to the upstream side end portion in the flowing direction (i.e., the arrow D direction) of the second sheath flow path 22. Namely, the sheath intake opening 24 is used in common for the second sheath flow path 22 and the first sheath flow path 20. A supply tube (not illustrated) that supplies the sheath fluid 4 (see FIG. 6A) is connected to the sheath intake opening 24. At the second sheath flow path 22, the sheath fluid 4 that is supplied from the sheath intake opening 24 flows in a direction toward the upstream side of the flow path 16. Two bent portions 22A, 22B are formed at the second sheath flow path 22 along the way of the flowing direction. The bent portions 22A, 22B of the second sheath flow path 22 are respectively bent in substantially orthogonal directions, and are formed such that the corner portions of the bent portions are curved in rounded shapes.

A merging portion 16A at which the specimen fluid 2 (see FIG. 6A) that is introduced in from the specimen flow path 18, and the sheath fluid 4 (see FIG. 6A) that is introduced in from the first sheath flow path 20, and the sheath fluid 4 that is introduced in from the second sheath flow path 22, are merged together is provided at the upstream side end portion in the flowing direction of the flow path 16 (i.e., the arrow A direction).

Figure 4A:
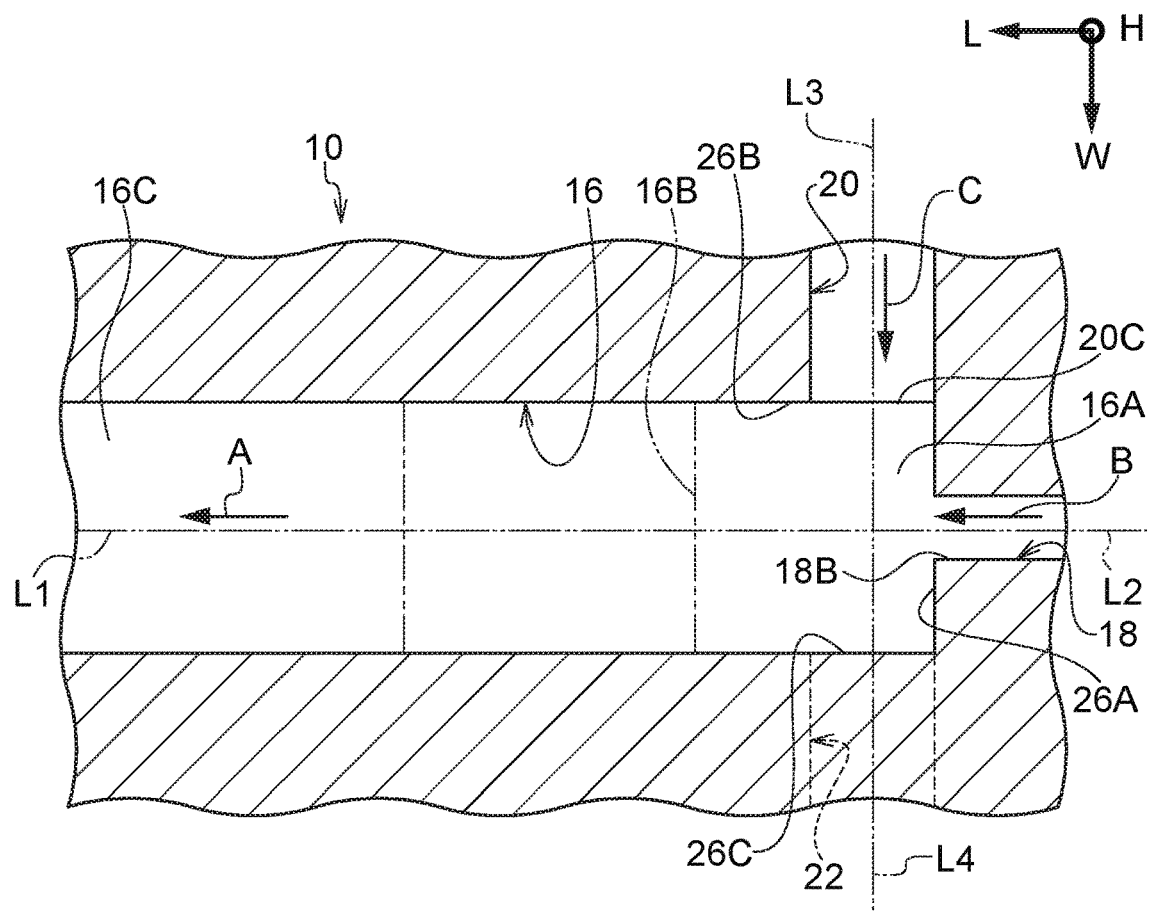
FIG. 4A is a plan sectional view showing a merging portion and a tapered portion of a flow path of the flow cell.
Figure 4B:
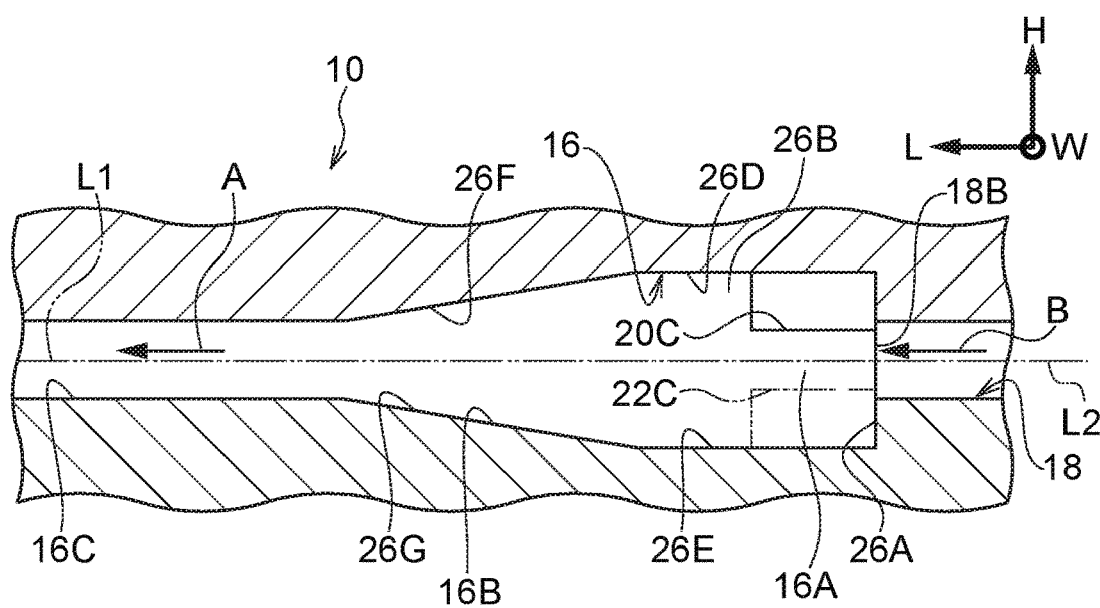
FIG. 4B is a vertical sectional view showing the merging portion and the tapered portion of the flow path of the flow cell.

As shown in FIG. 4A, FIG. 4B and FIG. 5, a specimen introducing opening 18B, which opens at an end surface 26A that is at the upstream side in the flowing direction of the flow path 16 (i.e., the arrow A direction in FIG. 4A, FIG. 4B), is provided at the downstream side end portion in the flowing direction of the specimen flow path 18 (i.e., the arrow B direction in FIG. 4A, FIG. 4B). The specimen introducing opening 18B is formed at an intermediate portion in the depth direction (i.e., the direction opposite H) of the end surface 26A of the flow path 16 (see FIG. 4B and FIG. 5). The specimen fluid 2 (see FIG. 6A) of the specimen flow path 18 is introduced in from the specimen introducing opening 18B to the merging portion 16A.

A first introducing opening 20C, which opens at a side surface 26B at the upstream side in the flowing direction of the flow path 16 (i.e., the arrow A direction), is provided at the downstream side end portion in the flowing direction of the first sheath flow path 20 (i.e., the arrow C direction). The side surface 26B of the flow path 16 is disposed in a direction orthogonal to the end surface 26A. The first introducing opening 20C is disposed so as to be shifted (i.e., offset) toward a depth direction one side with respect to the specimen introducing opening 18B. Namely, the first introducing opening 20C is formed at a position that is at a depth direction one side of the side surface 26B of the flow path 16 and that is adjacent to an upper surface portion 26D of the flow path 16 in FIG. 4B (see FIG. 4B and FIG. 5). The sheath fluid 4 (see FIG. 6A) of the first sheath flow path 20 is introduced into the merging portion 16A of the flow path 16 from the first introducing opening 20C.

A second introducing opening 22C, which opens at a side surface 26C that faces the first sheath flow path 20 at the upstream side in the flowing direction of the flow path 16 (i.e., the arrow A direction), is provided at the downstream side end portion in the flowing direction of the second sheath flow path 22 (i.e., the arrow D direction). The side surface 26C of the flow path 16 is disposed in a direction orthogonal to the end surface 26A, and is disposed substantially parallel to the side surface 26B. The second introducing opening 22C is disposed so as to be shifted (i.e., offset) toward the depth direction other side with respect to the specimen introducing opening 18B. Namely, the second introducing opening 22C is formed at a position that is at the depth direction other side of the side surface 26C of the flow path 16 and that is adjacent to a lower surface portion 26E of the flow path 16 in FIG. 4B (see FIG. 4B and FIG. 5). The sheath fluid 4 (see FIG. 6A) of the second sheath flow path 22 is introduced into the merging portion 16A of the flow path 16 from the second introducing opening 22C. In the depth direction of the flow path 16, the first introducing opening 20C and the second introducing opening 22C are disposed at positions that do not overlap. In other words, at the merging portion 16A, the first sheath flow path 20 and the second sheath flow path 22 face directions intersecting the central flow line L1 of the flow path 16, and are disposed at positions that are offset in the depth direction of the flow path 16.

In the flow cell 10 of the first embodiment, a central flow line L2 of the specimen flow path 18 is disposed on an extension of the central flow line L1 of the flow path 16 (see FIG. 4A and FIG. 4B). Moreover, in a vicinity of the merging portion 16A of the flow path 16, the central flow line L1 of the flow path 16 and central flow line L3 of the first sheath flow path 20 are orthogonal, and the central flow line L1 of the flow path 16 and central flow line L4 of the second sheath flow path 22 are orthogonal (see FIG. 4A). Further, in the first embodiment, in order not to waste the specimen fluid 2, the sheath fluid 4 (see FIG. 6A) is first introduced in from the first sheath flow path 20 and the second sheath flow path 22 via the merging portion 16A into the flow path 16. Then, in the state in which the sheath fluid 4 has been introduced into the merging portion 16A of the flow path 16, the specimen fluid 2 (see FIG. 6A) is introduced-in from the specimen flow path 18.

Further, in the flow cell 10 of the first embodiment, the specimen introducing opening 18B is disposed between the first introducing opening 20C and the second introducing opening 22C in the depth direction of the flow path 16 (see FIG. 4B and FIG. 5). More concretely, a depth direction one side (e.g., the upper portion) of the specimen introducing opening 18B and a portion of the first introducing opening 20C overlap one another, and the depth direction other side (e.g., the lower portion) of the specimen introducing opening 18B and a portion of the second introducing opening 22C overlap one another. The range in which the depth direction one side of the specimen introducing opening 18B and the portion of the first introducing opening 20C overlap one another is preferably less than or equal to ⅓ of the length of the specimen introducing opening 18B in the depth direction. Similarly, the range in which the depth direction other side of the specimen introducing opening 18B and the portion of the second introducing opening 22C overlap one another is preferably less than or equal to ⅓ of the length of the specimen introducing opening 18B in the depth direction. Note that, instead of the structure of the flow cell 10 of the first embodiment, there may be a structure in which the specimen introducing opening 18B is disposed between the first introducing opening 20C and the second introducing opening 22C, and moreover, the specimen introducing opening 18B and the first introducing opening 20C do not overlap in the depth direction, and the specimen introducing opening 18B and the second introducing opening 22C do not overlap in the depth direction.

A tapered portion 16B, whose depth becomes gradually more shallow toward the downstream side, is provided further toward the downstream side in the flowing direction (i.e., the arrow A direction) than the merging portion 16A of the flow path 16. In the first embodiment, the tapered portion 16B has a shape in which the interval between an upper surface portion 26F and a lower surface portion 26G in FIG. 4B gradually narrows, and is formed such that the upper surface portion 26F and the lower surface portion 26G have top/bottom symmetry in the length direction of the flow cell 10.

A planar portion 16C, whose depth is more shallow than that of the merging portion 16A, is formed further toward the downstream side in the flowing direction (i.e., the arrow A direction) than the tapered portion 16B of the flow path 16. The tapered portion 16B is a structure that connects the merging portion 16A and the planar portion 16C. At the planar portion 16C, for example, the specimen fluid 2 (see FIG. 6A) is imaged by a camera that serves as an imaging mechanism.

In the flow cell 10 of the first embodiment, as an example, the width of the planar portion 16C of the flow path 16 is approximately 2 mm, and the depth is approximately 50~100 μm. Further, as an example, the width of the specimen flow path 18 is approximately 1 mm, and the depth is approximately 50~100 μm. Further, as an example, the widths of the second sheath flow path 22 and the first sheath flow path 20 are approximately 1 mm, and the depths are approximately 50~100 μm.

As shown in FIG. 1 through FIG. 3, a discharge opening 16D, from which the fluid (i.e., the specimen fluid 2 and the sheath fluid 4) is discharged, is formed at the downstream side end portion in the flowing direction (i.e., the arrow A direction) of the flow path 16. An unillustrated discharge tube is connected to the discharge opening 16D, and the fluid (the specimen fluid 2 and the sheath fluid 4) is discharged from the discharge opening 16D into the discharge tube.

Figure 6A:
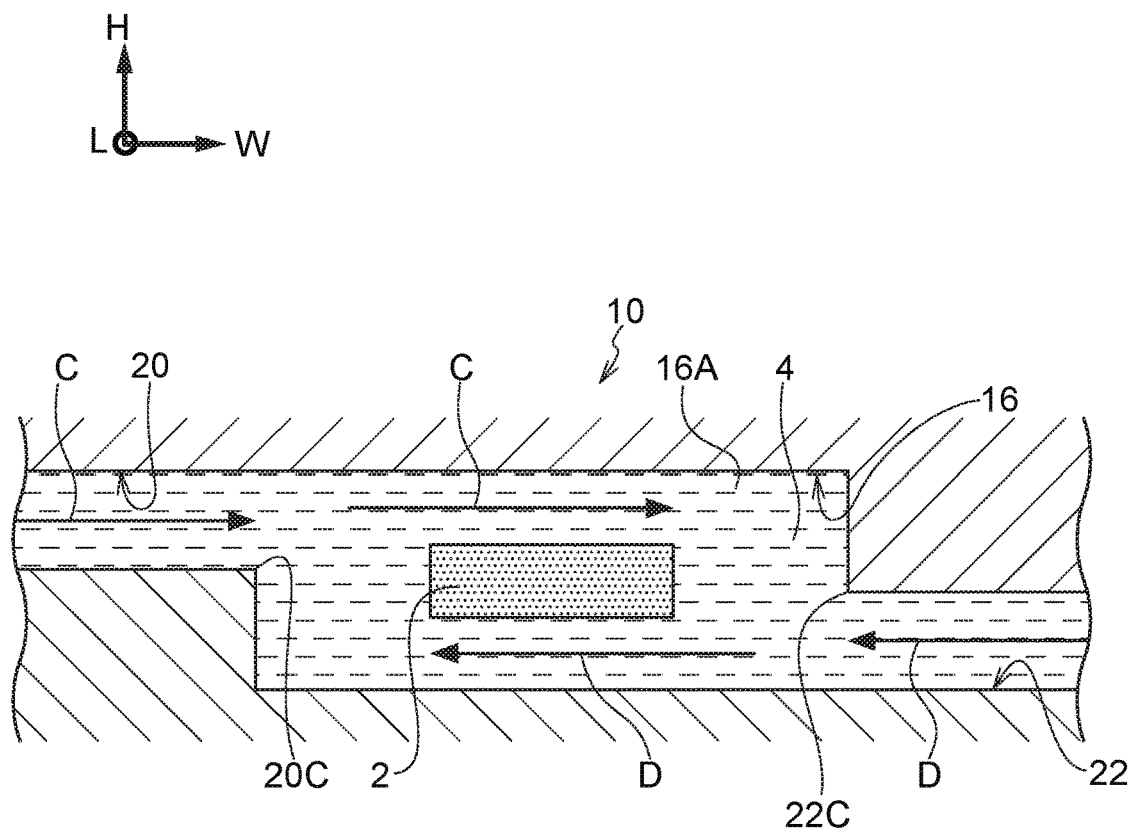
FIG. 6A is a cross-sectional view, in a direction orthogonal to the length direction of the flow path, showing the flows of the specimen fluid and the sheath fluid at the merging portion of the flow path.

The feed pressure of the specimen fluid 2 (see FIG. 6A) is set to be a pressure that is around 1~50 kPa higher than the feed pressure of the sheath fluid 4 (see FIG. 6A). The feed pressure of the specimen fluid 2 is set to be, for example, approximately 0.2 MPa.

The flow cell 10 is substantially transparent, and is formed from resin for example. In the first embodiment, the material of the flow cell 10 is, as an example, COP (e.g., cyclo olefin polymer, ZEONEX 480R), and is formed by injection molding. The flow path 16, the specimen flow path 18, the first sheath flow path 20, the second sheath flow path 22 and the like are formed in the first plate-shaped body 12 and the second plate-shaped body 14 by laser machining or the like. Further, positioning portions 12A are formed at the four corner portions of the first plate-shaped body 12 that is substantially rectangular, at the surface that faces the second plate-shaped body 14 (see FIG. 1). Further, positioning portions (not illustrated) that engage with the positioning portions 12A are formed at the four corner portions of the second-plate shaped body 14 that is substantially rectangular, at the surface that faces the first plate-shaped body 12. For example, the positioning portions 12A are concave portions or convex portions, and the positioning portions of the second plate-shaped body 14 are convex portions or concave portions that engage with the positioning portions 12A. The flow cell 10 is formed by aligning the positions of the positioning portions 12A of the first plate-shaped body 12 and the positioning portions of the second plate-shaped body 14, and affixing the first plate-shaped body 12 and the second plate-shaped body 14 together. In the first embodiment, as an example, the first plate-shaped body 12 and the second plate-shaped body 14 are affixed together by thermocompression bonding. The flow cell 10 is compact, and can be manufactured easily. Therefore, the specimen amount and sheath fluid amount that are needed are small. Further, when difficulties arise with the flow cell 10, they can be addressed rapidly by replacing the flow cell 10 with a new one.

Operation and Effects

Operation and effects of the flow cell 10 of the first embodiment are described next.

As shown in FIG. 3, a supply tube (not illustrated) that supplies the specimen fluid 2 (see FIG. 6A) to the intake opening 18A of the specimen flow path 18 is connected to the flow cell 10. The specimen fluid 2 is supplied from the intake opening 18A to the specimen flow path 18. At the specimen flow path 18, the specimen fluid 2 that has been supplied from the intake opening 18A flows in the arrow B direction toward the merging portion 16A of the flow path 16. Further, a supply tube (not illustrated) that supplies the sheath fluid 4 (see FIG. 6A) to the sheath intake opening 24 is connected to the flow cell 10. The sheath fluid 4 is supplied from the sheath intake opening 24 to the first sheath flow path 20 and the second sheath flow path 22, respectively. At the first sheath flow path 20, the sheath fluid 4 flows in the arrow C direction toward the merging portion 16A of the flow path 16. At the second sheath flow path 22, the sheath fluid 4 flows in the arrow D direction toward the merging portion 16A of the flow path 16.

The two bent portions 20A, 20B are formed at the first sheath flow path 20. Due to the sheath fluid 4 flowing through the bent portions 20A, 20B, the pressure loss becomes large. Similarly, the two bent portions 22A, 22B are formed at the second sheath flow path 22. Due to the sheath fluid 4 flowing through the bent portions 22A, 22B, the pressure loss becomes large.

As shown in FIG. 4A, FIG. 4B and FIG. 5, at the merging portion 16A of the flow path 16, the central flow line L2 of the specimen flow path 18 is disposed on an extension of the central flow line L1 of the flow path 16. Further, the central flow line L1 of the flow path 16 and the central flow line L3 of the first sheath flow path 20 are orthogonal, and the central flow line L1 of the flow path 16 and the central flow line L4 of the second sheath flow path 22 are orthogonal (see FIG. 4A). The specimen introducing opening 18B is formed in the end surface 26A that is at the upstream side of the flow path 16. The first introducing opening 20C is formed in the side surface 26B at the upstream side of the flow path 16, and the first introducing opening 20C is disposed so as to be offset toward a depth direction one side (e.g., the upper side) with respect to the specimen introducing opening 18B. The second introducing opening 22C is formed in the side surface 26C that faces the second sheath flow path 22 at the upstream side of the flow path 16. The second introducing opening 22C is disposed so as to be offset toward the depth direction other side (e.g., the lower side) with respect to the specimen introducing opening 18B. Namely, at the merging portion 16A, the first sheath flow path 20 and the second sheath flow path 22 face directions intersecting the central flow line L1 of the flow path 16, and are disposed at positions that are offset in the depth direction of the flow path 16. In the first embodiment, the specimen flow path 18 is disposed between the first sheath flow path 20 and the second sheath flow path 22 in the depth direction of the flow path 16.

Due thereto, the specimen fluid 2 (see FIG. 6A) of the specimen flow path 18 flows in the arrow B direction and is introduced into the merging portion 16A of the flow path 16 from the specimen introducing opening 18B. The sheath fluid 4 (see FIG. 6A) of the first sheath flow path 20 flows in the arrow C direction and is introduced into the merging portion 16A of the flow path 16 from the first introducing opening 20C. The sheath fluid 4 (see FIG. 6A) of the second sheath flow path 22 flows in the arrow D direction and is introduced into the merging portion 16A of the flow path 16 from the second introducing opening 22C (see FIG. 6A).

Figure 6B:
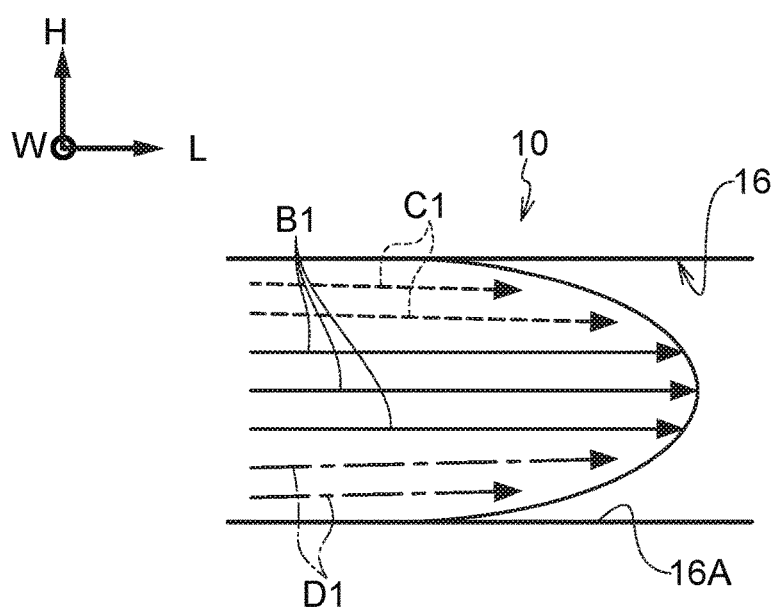
FIG. 6B is a cross-sectional view along the length direction of the flow path, showing the flowing directions of the specimen fluid and the sheath fluid at the merging portion of the flow path.

As shown in FIG. 6A, the specimen fluid 2 that has been introduced-in in the arrow B direction from the specimen introducing opening 18B, and the sheath fluid 4 that has been introduced-in in the arrow C direction from the first introducing opening 20C, and the sheath fluid 4 that has been introduced-in in the arrow D direction from the second introducing opening 22C, are merged at the merging portion 16A of the flow path 16. At this time, as shown in FIG. 6A and FIG. 6B, the specimen fluid 2 that is a laminar flow is nipped by the sheath fluid 4 from the upper and lower sides (i.e., the both sides) in the depth direction of the merging portion 16A of the flow path 16. Due thereto, disturbance of the laminar flow after the specimen fluid 2 and the sheath fluid 4 have merged is small, and mixing-together of the specimen fluid 2 and the sheath fluid 4 is suppressed. Namely, as shown in FIG. 6B, at the merging portion 16A of the flow path 16, the sheath fluid 4 that has been introduced in from the first introducing opening 20C flows in arrow C1 direction at the depth direction upper side of the flow path 16 toward the downstream side of the flow path 16, and the specimen fluid 2 flows in arrow B1 direction at the depth direction central portion toward the downstream side of the flow path 16. Moreover, the sheath fluid 4 that has been introduced in from the second introducing opening 22C flows in arrow D1 direction at the depth direction lower side. At the merging portion 16A, the flow velocity at which the specimen fluid 2 heads toward the downstream side of the flow path 16 is greater than the flow velocity at which the sheath fluid 4 heads toward the downstream side of the flow path 16. Therefore, the specimen fluid 2 can be made to flow in a laminar flow state shown by arrow B1 at the central portion in the depth direction of the sheath fluid 4 (see FIG. 9B), while mixing-together of the specimen fluid 2 with the sheath fluid 4 is suppressed.

Figure 7A:
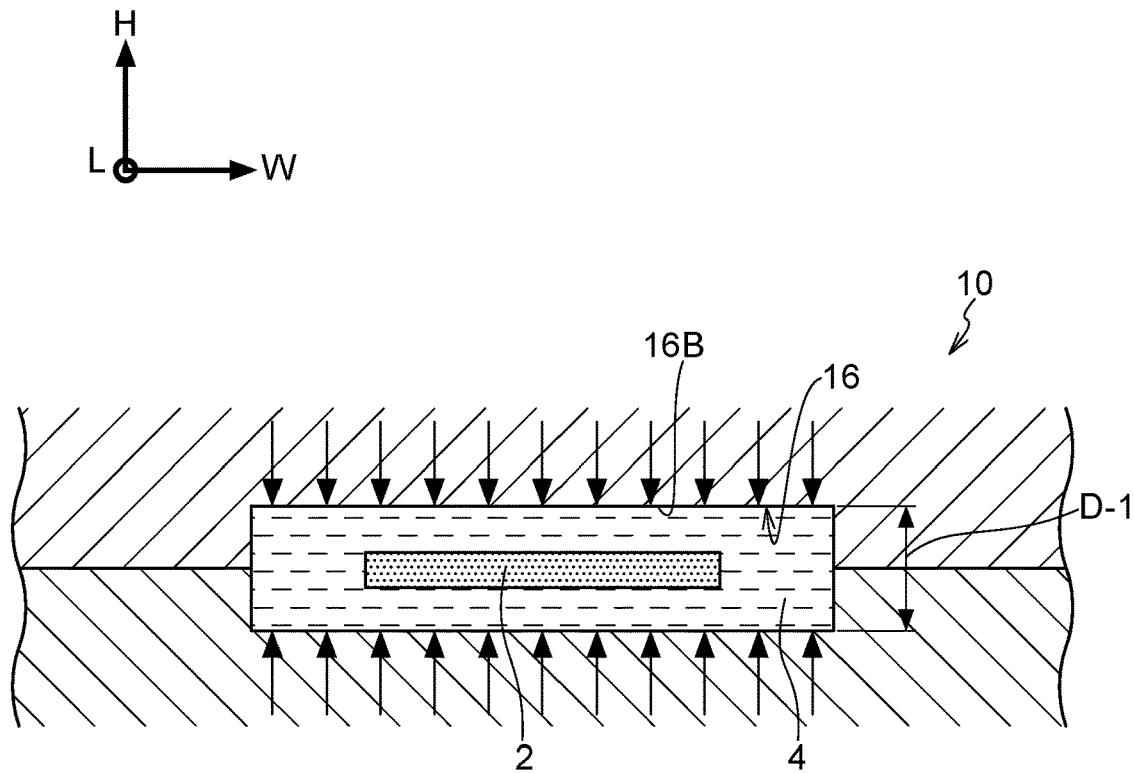
FIG. 7A is a cross-sectional view, in the direction orthogonal to the length direction of the flow path, showing the flows of the specimen fluid and the sheath fluid at the tapered portion of the flow path.
Figure 7B:
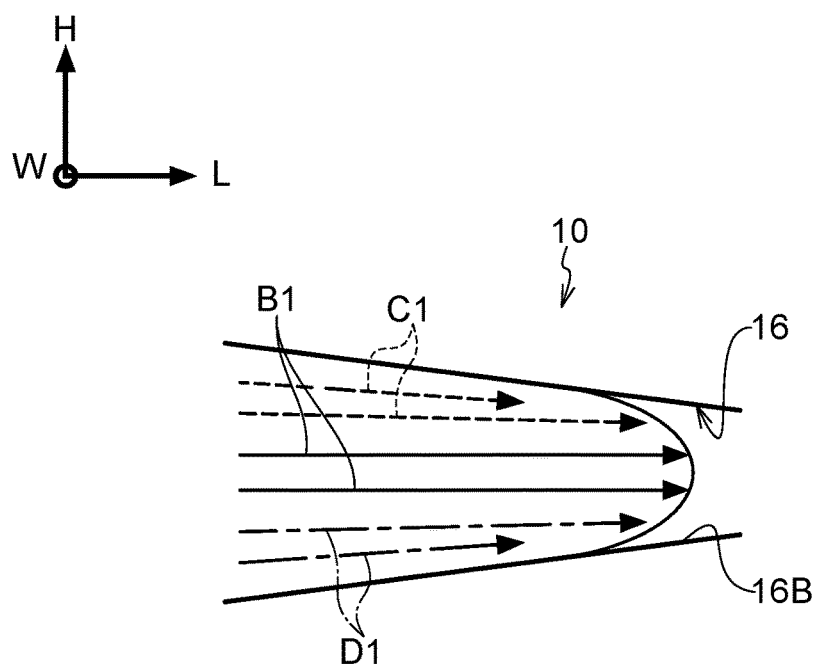
FIG. 7B is a cross-sectional view along the length direction of the flow path, showing the flowing directions of the specimen fluid and the sheath fluid at the tapered portion of the flow path.
Figure 9A:
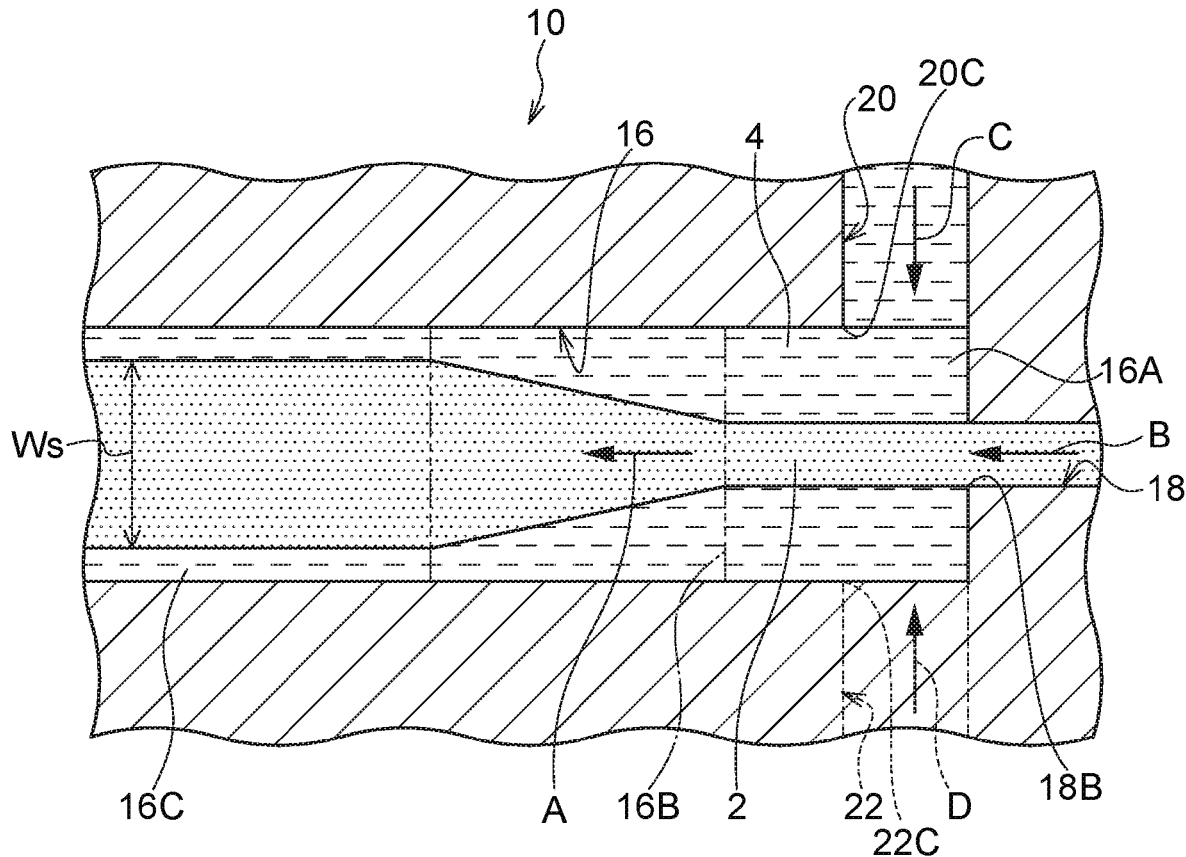
FIG. 9A is a plan sectional view that schematically shows a region of the specimen fluid and the sheath fluid that are flowing in the flow path.
Figure 9B:
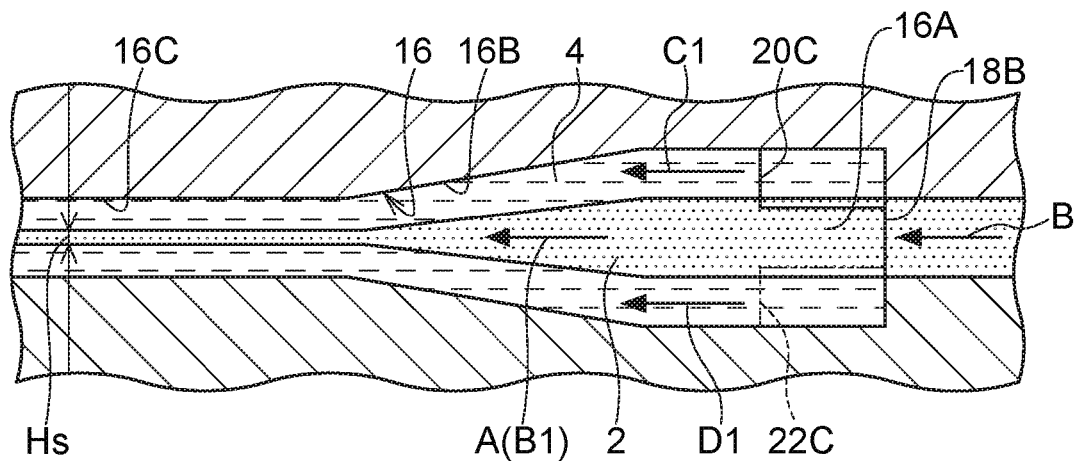
FIG. 9B is a vertical sectional view that schematically shows a region of the specimen fluid and the sheath fluid that are flowing in the flow path.

Moreover, the tapered portion 16B is provided at the flow path 16 at the downstream side of the merging portion 16A. The tapered portion 16B is structured so as to connect the merging portion 16A and the planar portion 16C that is at the downstream side of the flow path 16, and such that the depth thereof gradually becomes more shallow toward the downstream side (see FIG. 4B and FIG. 5). As shown in FIG. 7A and FIG. 7B, after the specimen fluid 2 and the sheath fluid 4 merge at the flow path 16, due to the fluids flowing through the tapered portion 16B, depth D-1 of the entire fluid gradually becomes more shallow, and the specimen fluid 2 can be collected in a laminar flow state at the central portion in the depth direction of the sheath fluid 4. Namely, as shown in FIG. 9A and FIG. 9B, at the tapered portion 16B of the flow path 16, at the central portion of the sheath fluid 4, thickness Hs of the specimen fluid 2 in the depth direction gradually becomes thinner, and width Ws of the specimen fluid 2 in the direction orthogonal to the depth direction gradually becomes larger.

Figure 8A:
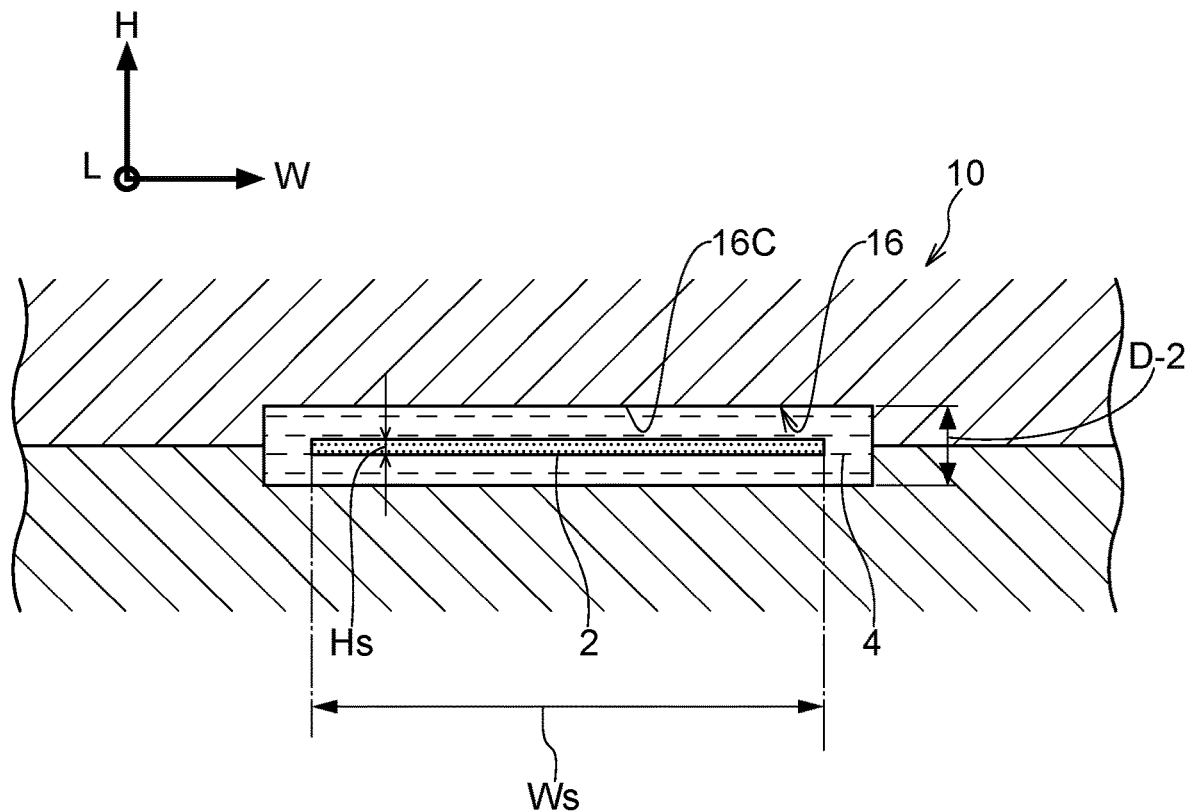
FIG. 8A is a cross-sectional view, in the direction orthogonal to the length direction of the flow path, showing the flows of the specimen fluid and the sheath fluid at a planar portion of the flow path.
Figure 8B:
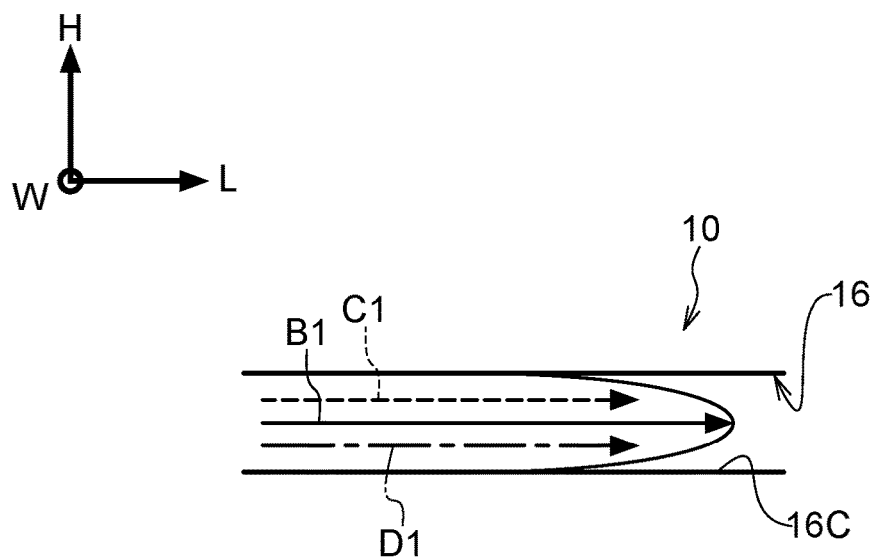
FIG. 8B is a cross-sectional view along the length direction of the flow path, showing the flowing directions of the specimen fluid and the sheath fluid at the planar portion of the flow path.

Further, as shown in FIG. 8A and FIG. 8B, at the planar portion 16C of the flow path 16, depth D-2 of the entire fluid is the most shallow, and the thickness Hs in the depth direction of the specimen fluid 2 at the central portion of the sheath fluid 4 can be made to be small. Namely, as shown in FIG. 9A and FIG. 9B, at the planar portion 16C of the flow path 16, at the central portion of the sheath fluid 4, the thickness Hs of the specimen fluid 2 in the depth direction is thin, and the width Ws of the specimen fluid 2 in the direction orthogonal to the depth direction is large. In the first embodiment, the width of the planar portion 16C of the flow path 16 is approximately 2 mm, and the depth is approximately 50·100 μm. At this time, the thickness Hs of the specimen fluid 2 in the depth direction is, as an example, 5~30 μm. Therefore, at the planar portion 16C of the flow path 16, when the specimen fluid 2 is imaged by the imaging mechanism (not illustrated), the specimen fluid 2 can be kept within the depth of field.

Moreover, further downstream than the planar portion 16C of the flow path 16, the specimen fluid 2 and the sheath fluid 4 are discharged-out from the discharge opening 16D to the discharge tube (not illustrated).

At the above-described flow cell 10, the central flow line L1 of the flow path 16 and the central flow line L3 of the first sheath flow path 20 are orthogonal, and the central flow line L1 of the flow path 16 and the central flow line L4 of the second sheath flow path 22 are orthogonal. Due thereto, the specimen fluid 2 is introduced into the merging portion 16A of the flow path 16, and the sheath fluid 4 is introduced in from both sides in the direction orthogonal to the specimen fluid 2. Therefore, disturbance of the laminar flow after the specimen fluid 2 and the sheath fluid 4 have merged together is small, and the specimen fluid 2 and the sheath fluid 4 mixing-together is suppressed more reliably.

Further, at the flow cell 10, the sheath intake opening 24 of the first sheath flow path 20 and the second sheath flow path 22 is used in common for the both, and the bent portions 20A, 20B are formed along the way of the first sheath flow path 20, and the bent portions 22A, 22B are formed symmetrically along the way of the second sheath flow path 22. Due thereto, the sheath fluid 44 that is supplied from the sheath intake opening 24 is branched-off uniformly to the first sheath flow path 20 and the second sheath flow path 22, and the sheath fluid 4 flows through the bent portions 20A, 20B that are formed along the way of the first sheath flow path 20, and is introduced into the merging portion 16A of the flow path 16. Together therewith, the sheath fluid 4 flows through the bent portions 22A, 22B that are formed along the way of the second sheath flow path 22, and is introduced into the merging portion 16A of the flow path 16. The feed pressures for the specimen fluid 2 and the sheath fluid 4 at the intake opening 18A and the sheath intake opening 24 are set to be the same. At this time, due to the bent portions 20A, 20B of the first sheath flow path 20 and the bent portions 22A, 22B of the second sheath flow path 22, the pressure loss of the sheath fluid 4 is greater than the pressure loss of the specimen fluid 2 that is generated at the specimen flow path 18. Due thereto, a difference in the pressures of the specimen fluid 2 and the sheath fluid 4 at the merging portion 16A of the flow path 16 arises. Therefore, at the merging portion 16A of the flow path 16, the pressure of the specimen fluid 4 is greater than the pressure of the sheath fluid 4, and thus, the specimen fluid 2 and the sheath fluid 4 mixing-together is suppressed more reliably, and it is easy for the specimen fluid 2 to flow in a laminar flow state at the central portion in the depth direction of the sheath fluid 4.

In the first embodiment, due to the feed pressure of the specimen fluid 2 and the feed pressure of the sheath fluid 4 being maintained at a high pressure of 1~50 kPa for example, the specimen fluid 2 flows at the central portion in the depth direction of the sheath fluid 4. If the pressure difference between the specimen fluid 2 and the sheath fluid 4 is made to be large, the thickness Hs of the specimen fluid 2 and the width Ws of the specimen fluid 2 become large. In the first embodiment, the flow rate ratio of the specimen fluid 2 and the sheath fluid 4 is made to be within a range of 1:20~50. On the other hand, if the pressure difference between the specimen fluid 2 and the sheath fluid 4 is made to be larger than 50 kPa, there is the possible that turbulence may arise within the flow path 16, and there is the possibility that the specimen fluid 2 may become disturbed within the flow path 16. Further, if there is hardly any pressure difference between the specimen fluid 2 and the sheath fluid 4, it is difficult to make the specimen fluid 2 flow in a laminar flow state at the central portion in the depth direction of the sheath fluid 4.

In the first embodiment, the bent portions (20A, 20B, 22A, 22B) are provided as pressure regulating mechanisms at the sheath flow paths (20, 22). However, a pressure loss may be generated by making the flow path diameter small, or by providing a mechanism that impedes the flow, or the like. Further, in the first embodiment, because conditions are easy to set, the feed pressures of the specimen fluid 2 and the sheath fluid 4 at the respective intake openings (18A, 24) are set to be the same, but the feed pressures at the respective intake openings (18A, 24) may be different.

(Structure of Measuring Device)

Figure 10:
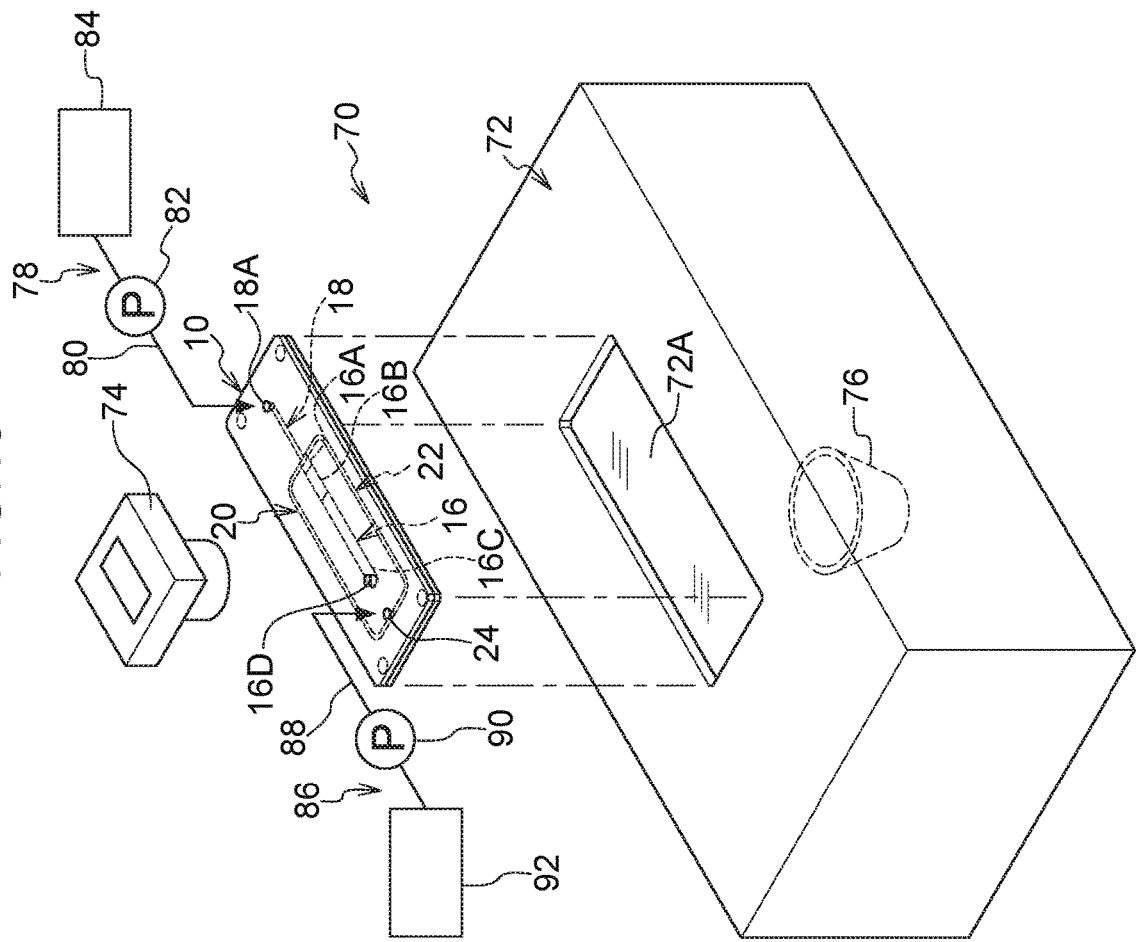
FIG. 10 is a perspective view showing a measuring device that images the specimen fluid that is supplied to the flow cell.
Figure 11:
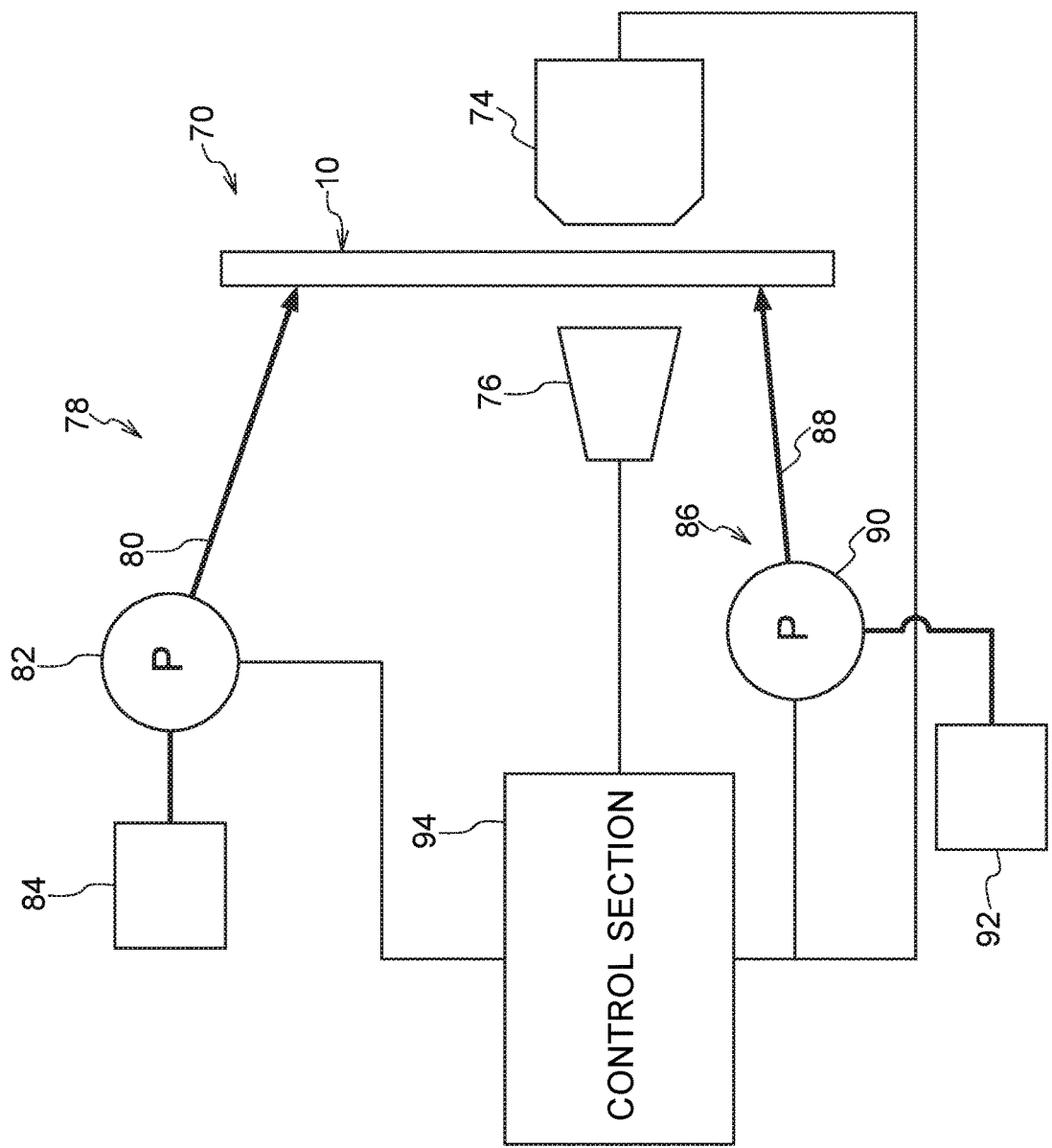
FIG. 11 is a side view showing the measuring device that is shown in FIG. 10.

A measuring device 70 is shown in FIG. 10 in a perspective view. The measuring device 70 is shown in FIG. 11 in a side view. The measuring device 70 images the specimen fluid 2 (see FIG. 6A) by using the flow cell 10 of the first embodiment.

As shown in FIG. 10 and FIG. 11, the measuring device 70 has a housing 72 at which the flow cell 10 is disposed, and a camera 74 that serves as an imaging mechanism and is provided at a position facing the flow cell 10. The housing 72 has a concave portion 72A into which the flow cell 10 is inserted. The position that includes the concave portion 72A of the housing 72 is formed by a transparent member (e.g., glass or the like). A light source 76 is provided at the interior of the housing 72 at a position facing the camera 74 with the flow cell 10 located therebetween. The camera 74 is disposed at a position facing the planar portion 16C of the flow path 16 of the flow cell 10.

The measuring device 70 has a first supply device 78 that serves as a specimen supplying mechanism and supplies the specimen fluid 2 (see FIG. 6A) to the intake opening 18A of the specimen flow path 18 of the flow cell 10. The first supply device 78 has a supply tube 80 whose one end portion is connected to the intake opening 18A, a pump 82 that is provided along the way of the supply tube 80, and a specimen storing portion 84 that is connected to the other end portion of the supply tube 80 and in which the specimen fluid 2 is stored (see FIG. 10).

The measuring device 70 has a second supply device 86 that serves as a sheath supplying mechanism and supplies the sheath fluid 4 (see FIG. 6A) to the sheath intake opening 24 of the first sheath flow path 20 and the second sheath flow path 22 of the flow cell 10. The second supply device 86 has a supply tube 88 whose one end portion is connected to the sheath intake opening 24, a pump 90 that is provided along the way of the supply tube 88, and a tank 92 that is connected to the other end portion of the supply tube 88 and in which the sheath fluid 4 is stored (see FIG. 10). Moreover, the measuring device 70 has a control section 94 (see FIG. 11) that controls the respective operations of the camera 74, the light source 76, the pump 82 and the pump 90. The control section 94, by pulse signals, causes the light source 76 to emit light at a predetermined interval, and further, by driving the pumps 82, 90, the control section 94 controls the pressures of the specimen fluid 2 and the sheath fluid 4. Moreover, a waste tank (not illustrated) is connected to the discharge opening 16D of the flow path 16 of the flow cell 10 via an unillustrated discharge tube.

(Operation and Effects of Measuring Device)

At the measuring device 70, due to the pump 90 being driven, the sheath fluid 4 (see FIG. 6A) is supplied from the tank 92 through the sheath intake opening 24 of the flow cell 10 to the first sheath flow path 20 and the second sheath flow path 22. The sheath fluid 4 is first supplied to the flow cell 10, and, after the sheath fluid 4 has been introduced into the merging portion 16A of the flow path 16, the supplying of the specimen fluid 2 is started. Due to the pump 82 being driven, the specimen fluid 2 (see FIG. 6A) is supplied from the specimen storing portion 84 through the intake opening 18A of the flow cell 10 to the specimen flow path 18.

At the flow cell 10, as described above, the specimen fluid 2 and the sheath fluid 4 merge together at the merging portion 16A of the flow path 16, and thereafter, flow through the tapered portion 16B. Due thereto, the depth D-1 of the entire fluid gradually becomes more shallow, and the specimen fluid 2 can be collected in a laminar flow state at the central portion in the depth direction of the sheath fluid 4 (see FIG. 9B). Further, at the planar portion 16C of the flow path 16, at the central portion of the sheath fluid 4, the thickness Hs of the specimen fluid 2 in the depth direction becomes thin, and the width Ws of the specimen fluid 2 in the direction orthogonal to the depth direction becomes large (see FIG. 9A).

At the measuring device 70, the camera 74 is disposed at a position facing the planar portion 16C of the flow cell 10. Due to the camera 74 being operated and the light source 76 being made to emit light, the specimen fluid 2 that flows through the planar portion 16C of the flow cell 10 is imaged. The focal point of the camera 74 is adjusted so as to coincide with the central flow line of the planar portion 16C.

At the above-described measuring device 70, the camera 74 is disposed at a position facing the planar portion 16C where the depth is the more shallow than at the merging portion 16A at the flow cell 10. Because the focal point of the camera 74 is adjusted so as to coincide with the central flow line of the planar portion 16C, some of the specimen fluid 2 falling outside of the depth of field of the camera 74 is suppressed. Namely, when the specimen fluid 2 is imaged by the camera 74, the specimen fluid 2 can be kept within the depth of field.

Note that the above-described first embodiment is structured such that space is provided between the merging portion 16A and the tapered portion 16B of the flow path 16 of the flow cell 10 (see FIG. 1), but the tapered portion may be provided adjacent to the downstream side of the merging portion of the flow path.

Figure 12:
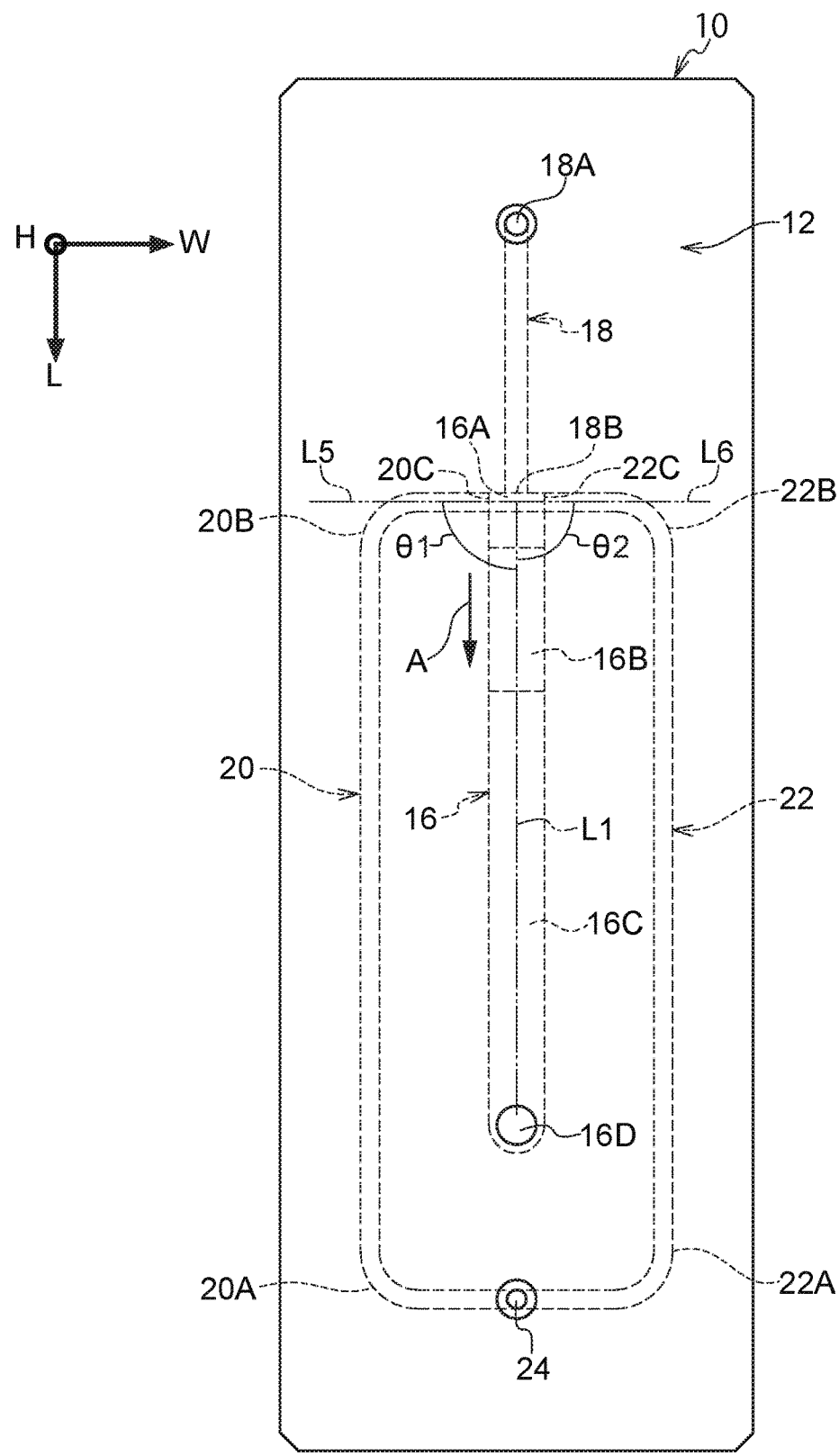
FIG. 12 is a plan view showing the angles of a first sheath flow path and a second sheath flow path with respect to the flow path, at the flow cell relating to a modified example.

Note that, in the above-described first embodiment, at the merging portion 16A of the flow path 16, the central flow line of the flow path 16 and the central flow line of the first sheath flow path 20 are orthogonal, and the central flow line of the flow path 16 and the central flow line of the second sheath flow path 22 are orthogonal. However, the present disclosure is not limited to this structure. For example, the central flow line of the first sheath flow path 20 may be disposed so as to intersect the central flow line L1 of the flow path 16, and the central flow line of the second sheath flow path 22 may be disposed so as to intersect the central flow line L1 of the flow path 16. At a flow cell relating to a modified example, as shown in FIG. 12, for example, angle θ1 of a central flow line L5 of the first sheath flow path 20 with respect to the central flow line L1 of the flow path 16 may be made to be within a range of 90°~150°. Further, at the flow cell relating to the modified example, angle θ2 of a central flow line L6 of the second sheath flow path 22 with respect to the central flow line L1 of the flow path 16 may be made to be within a range of 90°~150°.

Further, in the above-described first embodiment, the shapes of the first sheath flow path 20 and the second sheath flow path 22 as seen in a plan view of the flow cell can be changed. Further, in the first and second embodiments, the sheath intake opening 24 is used in common for the first sheath flow path 20 and the second sheath flow path 22, but embodiments of the present disclosure are not limited to this structure. For example, intake openings for the sheath fluid may be provided separately for the first sheath flow path and the second sheath flow path. Further, the first sheath flow path 20 and the second sheath flow path 22 do not have to be symmetrical shapes.

Further, in the above-described first embodiment, the lengths in the length directions, and the widths in directions orthogonal to the length directions, and the like of the specimen flow path 18 and the flow paths 16 of the flow cell can be changed.

Although forms for embodying the present disclosure have been described by using embodiments as examples, these embodiments are examples, and the present disclosure can be embodied by being modified in various ways within a scope that does not depart from the gist thereof. Further, the scope of the present disclosure is not to be limited by these embodiments, and it goes without saying that the present disclosure can be embodied in various forms within a scope that does not depart from the gist of the embodiments of the present disclosure.

The disclosure of Japanese Patent Application No. 2017-004318 that was filed on Jan. 13, 2017 is, in its entirety, incorporated by reference into the present specification. All publications, patent applications, and technical standards mentioned in the present specification are incorporated by reference into the present specification to the same extent as if such individual publication, patent application, or technical standard was specifically and individually indicated to be incorporated by reference.

What is claimed is:

1. A flow cell comprising:
    a flow path in which a specimen fluid and a sheath fluid flow;
    a specimen flow path that introduces the specimen fluid into the flow path;
    a first sheath flow path and a second sheath flow path that introduce the sheath fluid into the flow path; and
    a merging portion at which the specimen flow path, the first sheath flow path and the second sheath flow path merge together,
    wherein:
    the specimen flow path is provided on a central flow line of the flow path,
    the first sheath flow path has a first introducing opening that leads to the merging portion,
    the second sheath flow path has a second introducing opening that leads to the merging portion,
    the specimen flow path has a specimen introducing opening that leads to the merging portion,
    at the merging portion, the first introducing opening and the second introducing opening face directions intersecting the central flow line of the flow path and are disposed at positions that are offset in a height direction of the flow path, and
    the specimen introducing opening is disposed, at the merging portion, such that, when viewed as a cross-section in a direction along the central flow line of the flow path, there is a first gap between a side wall that faces the first introducing opening and a first side wall of the specimen introducing opening furthest from the first introducing opening, the side wall that faces the first introducing opening and a wall that forms the first gap form a 90° angle, and a second gap between a side wall that faces the second introducing opening and a second side wall of the specimen introducing opening furthest from the second introducing opening.

2. The flow cell of claim 1, wherein the specimen flow path is disposed between the first sheath flow path and the second sheath flow path in the height direction of the flow path.

3. The flow cell of claim 1, further comprising:
    a planar portion that is formed at a downstream side of the flow path, and whose height is lower than a height of the merging portion; and
    a tapered portion that connects the merging portion and the planar portion, and whose height gradually becomes lower toward a downstream side.

4. The flow cell of claim 1, wherein the central flow line of the flow path and a central flow line of the first sheath flow path are orthogonal, and the central flow line of the flow path and a central flow line of the second sheath flow path are orthogonal.

5. The flow cell of claim 1, wherein:
    a sheath intake opening is used in common for the first sheath flow path and the second sheath flow path, and
    bent portions are formed along the first sheath flow path and the second sheath flow path.

6. A measuring device comprising:
    the flow cell of claim 1;
    a camera, which is provided at a position facing the flow cell, for imaging the specimen fluid that flows at a downstream side of the flow path;

a specimen supplying pump, which is connected to the specimen flow path, for supplying the specimen fluid to the specimen flow path; and a sheath supplying pump, which is connected to the first sheath flow path and the second sheath flow path, for supplying the sheath fluid to the first sheath flow path and the second sheath flow path.

7. The measuring device of claim 6, wherein the camera is disposed at a position facing a planar portion whose height is lower than a height of the merging portion at the flow cell.

* * * * *